United States Patent [19]

Ackroyd et al.

[11] Patent Number: 4,821,763
[45] Date of Patent: Apr. 18, 1989

[54] TAMPERPROOF COUPLING

[75] Inventors: Rand H. Ackroyd, Methuen; Mark T. Corcoran, Dracut, both of Mass.

[73] Assignee: Watts Regulator Company, North Andover, Mass.

[21] Appl. No.: 181,225

[22] Filed: Apr. 13, 1988

[51] Int. Cl.⁴ .................... F16K 24/02; F16K 35/00
[52] U.S. Cl. ................................. 137/218; 137/798; 285/81
[58] Field of Search ............... 137/218, 798; 285/81, 285/89, 92, 392; 411/227, 228, 432, 433, 941.1

[56] References Cited

U.S. PATENT DOCUMENTS 2,728,895 12/1955 Quackenbush et al. .
2,997,054 8/1961 Woodford .
3,414,001 12/1968 Woodford .
3,459,443 8/1969 Butters et al. .
3,543,786 12/1970 Woodford .
3,635,501 1/1972 Thorne .............................. 785/81 X
3,942,570 3/1976 Bochman, Jr. et al. .
4,117,856 10/1978 Carlson .
4,126,335 11/1978 Voss .

FOREIGN PATENT DOCUMENTS 2046389 11/1980 United Kingdom ................. 285/81

Primary Examiner—Gerald A. Michalsky

[57] ABSTRACT

A coupling device for a liquid conduit system has a body defining a liquid flow passage and having an orifice defined by a generally cylindrical surface about an axis, and, disposed within the orifice, an insert. The cylindrical surface of the orifice defines a shoulder surface disposed generally parallel to the orifice axis. The insert has a threaded inner surface, and is sized for rotation relative to the orifice surface in a first direction about the orifice axis. The insert also defines an engagement surface that engages upon the orifice shoulder surface to restrict rotation of the insert relative to the orifice surface in the second, opposite direction. The insert is a split ring, and the engagement surface is defined by a radially aligned surface of the split ring.

4 Claims, 1 Drawing Sheet

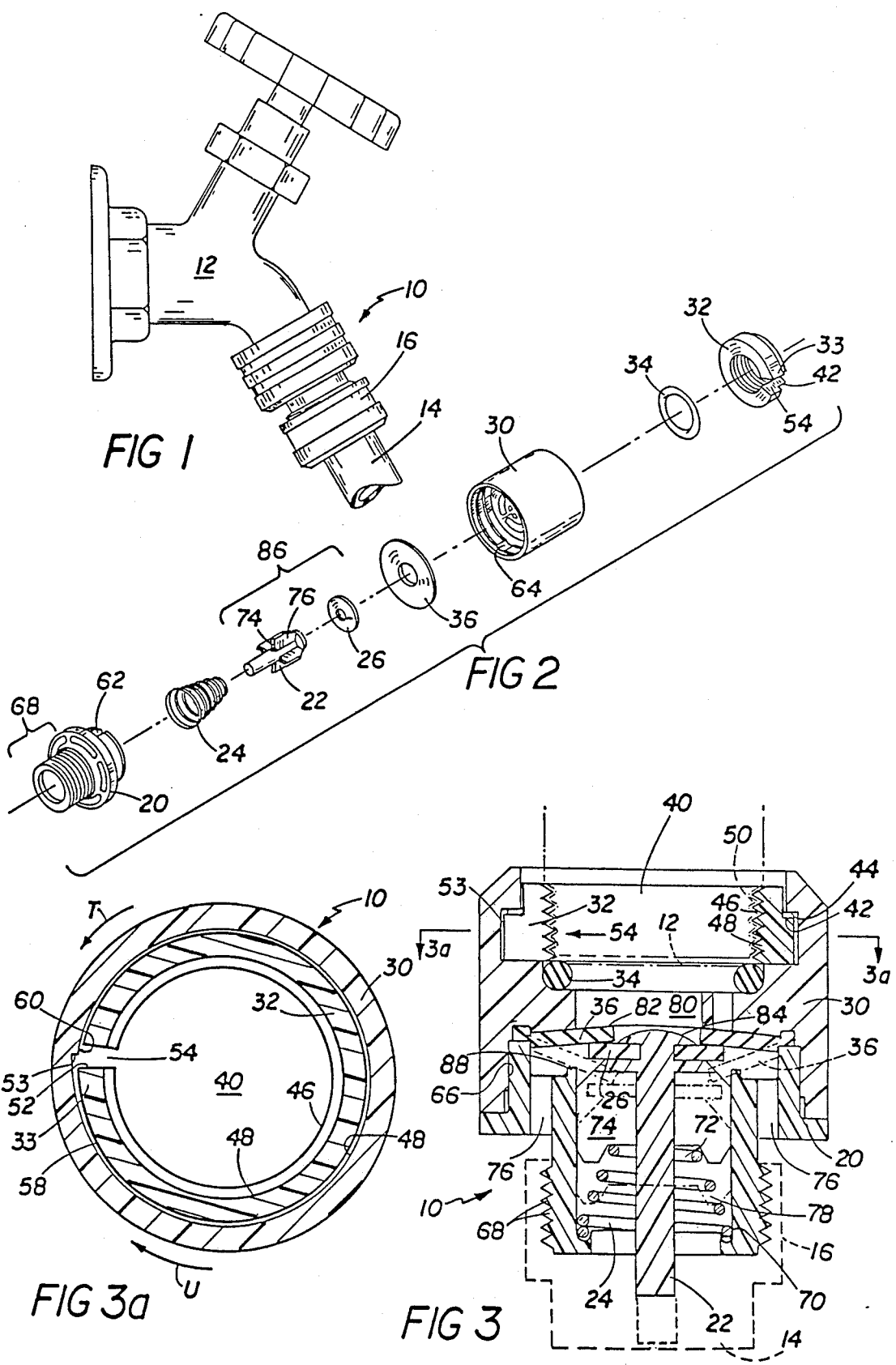

TAMPERPROOF COUPLING

The invention relates to coupling structures for connecting hoses or the like to a water supply in a manner to prevent them from being separated.

Tamperproof couplings provide means for connecting hoses to sillcocks or the like in a way that the coupling may be threaded onto the sillcock, but cannot be removed, or can be removed only with a special tool. The coupling typically contains means to prevent siphoning of liquid back through the hose and sillcock, and perhaps contaminating the water supply, e.g., with fertilizer drawn from the end of the hose. Butters et al. U.S. Pat. No. 3,459,443 described a tamperproof coupling having a receiving orifice containing a coiled wire having a sharpened end which in one direction of rotation (threading) bore in braking action against the wall of the orifice for threaded coupling with a sillcock, and in the other direction of rotation (unthreading) turned freely to prevent uncoupling.

SUMMARY OF THE INVENTION

According to the invention, a coupling device for a liquid conduit system comprises a body defining a liquid flow passage and having an orifice defined by a generally cylindrical surface about an axis, the surface further defining a shoulder surface disposed generally parallel to the axis of the orifice, and disposed within the orifice, an insert means having a threaded inner surface, and sized for rotation relative to the cylindrical surface of the orifice in a first direction about the axis of the orifice, and defining an engagement surface adapted adapted to engage upon the shoulder surface of the orifice to restrict rotation of the insert means relative to the cylindrical surface of the orifice in a second, opposite direction. The insert means comprises a split ring and the engagement surface is defined by a radially aligned surface of the split ring. For assembling the coupling device with a male threaded element, the body is rotated in the first direction, with the engagement surface of the insert means engaged upon the shoulder surface of the orifice, to rotate the insert means to interengage the threads of the insert means and the male thread element. When the body is rotated in the second direction, the cylindrical surface of the orifice rotates about the insert means, and the threads of the insert means do not disengage from threads of the male threaded member.

Preferred embodiments of the invention may include one or more of the following features. The engagement surface is defined by a protrusion extending radially outwardly from the outer surface of the insert means. The insert means is formed of resilient plastic material. The coupling device further comprises anti-siphon backflow prevention means.

These and other features and advantages of the invention will be seen from the following description of a presently preferred embodiment, and from the claims.

PREFERRED EMBODIMENT

We first briefly describe the drawings.

FIG. 1 is a side view of a tamperproof coupling of the invention connecting a hose to a sillcock;

FIG. 2 is an exploded view of the tamperproof coupling of FIG. 1; and

FIG. 3 is an enlarged sectional view of the tamperproof coupling of the invention, while FIG. 3a is a top sectional view at the line 3a-3a of FIG. 3.

Referring to FIG. 1, the tamperproof coupling 10 of the invention is threaded onto a sillcock 12, for connection of the sillcock to a hose 14 via threaded hose coupling 16.

Referring to FIG. 2, the tamperproof coupling 10 consists of a body 20, containing stem disc holder 22, spring 24 and disc 26; and an adaptor 30 containing a split ring insert 32 and hose seal o-ring 34. The body and adaptor are assembled (FIG. 3) with diaphragm 36 disposed therebetween. The body 20, adaptor 30, insert 32 and stem disc holder 22 are formed, by injection molding of a suitable thermoplastic, e.g., polypthalene oxide (PPO). The disc 26, diaphragm 36 and hose seal o-ring 34 are formed of suitable resilient materials, e.g., synthetic rubber. The spring 24 is a coil of 0.028 inch diameter stainless steel wire, tapering from a major (lower) diameter of 0.687 inch to a minor (upper) diameter of 0.400 inch.

Referring also to FIG. 3, split ring insert 32 is disposed within generally cylindrical orifice 40 of body 30, retained axially by engagement of insert shoulder 42 upon body shoulder 44. The inner surface 46 of insert 32 defines threads 48 sized to tightly receive the male threads 50 of sillcock 12. (The inner diameter of the insert is undersized relative to the sillcock to ensure a secure interengagement, the insert expanding resiliently to receive the sillcock threads.) Referring to FIG. 3a, circumferential surface 48 of orifice 40 defines a shoulder 53 opposed to movement of the adaptor 30 about the insert 32 in the threading direction (arrow T). As the coupling insert threads 46 are threaded onto the threads 50 of sillcock 12, the opposed shoulder surface 53 of the adaptor 30 bears upon the opposed surface 52 of insert protrusion 33 which protrudes from the outer surface of the insert 32 adjacent the split 54 to cause the insert to be rotated with the adaptor, thus allowing the coupling to be threaded onto the sillcock. If the coupling is rotated in the unthreading direction (arrow U), the outer surface 58 of the protrusion 33 of the insert 32 at the split 54 rides upon the ramp surface 60 of the surface 48 of the adaptor orifice, the resilience of the plastic material of the insert allowing it to flex inwardly, and the adaptor is allowed to rotate freely about the insert, so the coupling may not be uncoupled from the sillcock. Engagement of the opposed axial shoulders 42, 44 of the insert 32 and adaptor 30 prevents axial disengagement, and the coupling may not be uncoupled from the sillcock without destruction of the coupling.

The body 20 also defines lugs 62 (FIG. 2) received in keys 64 defined in the wall 66 of the adaptor to resist disassembly of the coupling by torque applied to the joint of adaptor 30 and body 20 formed, e.g., by ultrasonic welding.

In operation, tamperproof coupling 10 is threaded onto sillcock 12 until the sillcock sealingly engages hose seal o-ring 34; and hose coupling 16 is threaded onto the male threads 68 of the body (FIG. 1 and 3). Spring 24, bearing upon shoulder 70 of the body and undersurfaces 72 of the arms 74 of stem disc holder 22, urges the disc 26 into sealing engagement with the diaphragm 36. Ventilating ports 76 keep the lower chamber 78 of the coupling at atmospheric pressure to prevent siphoning of water through the coupling back into the sillcock, and thus into the main water supply.

When the sillcock is opened, water pressure in the upper chamber 80 bears upon the upper surfaces 82, 84 of the diaphragm 36 and the disc-and-stem-disc-holder assembly 86, urging the diaphragm 36 downward (dashed line position) into sealing engagement with the annular seat 88 inward of the ventilation ports 76, and urging the disc-and-stem-disc-holder assembly 86 downward (dashed line position) for flow of water from the upper chamber 80 into the lower chamber 78 and thus through the hose 14.

Other embodiments of the invention are within the following claims.

What is claimed is:

1. A coupling device for a liquid conduit system comprising:

a body defining a liquid flow passage and having an orifice defined by a generally cylindrical surface about an axis, said surface further defining a shoulder surface disposed generally parallel to said axis of said orifice, and disposed within said orifice, an insert means having a threaded inner surface, and sized for rotation relative to the cylindrical surface of said orifice in a first direction about the axis of said orifice, and defining an engagement surface adapted to engage upon the shoulder surface of said orifice to restrict rotation of said insert means relative to the cylindrical surface of said orifice in a second, opposite direction, said insert means comprising a split ring and said engagement surface being defined by a radially aligned surface of the split ring, whereby, for assembling said coupling device with a male threaded element, said body is rotated in the first direction, with said engagement surface of said insert means engaged upon the shoulder surface of said orifice, to rotate said insert means to interengage the threads of said insert means and said male thread element, and when said body is rotated in the second direction, the cylindrical surface of the orifice rotates about the insert means, and the threads of the insert means do not disengage from threads of the male threaded member, said threaded inner surface of said split ring having a diameter that is undersized relative to said male threaded element.

2. The coupling device of claim 1 wherein said engagement surface is defined by a protrusion extending radially outwardly from the outer surface of said insert means.

3. The coupling device of claim 1 wherein said insert means is formed of resilient plastic material.

4. The coupling device of claim 1 further comprising anti-siphon backflow prevention means.

* * * * *